(12) United States Patent
Hoang (10) Patent No.: US 12,466,579 B2
(45) Date of Patent: Nov. 11, 2025

(54) METHODS AND SYSTEMS FOR MANAGING PASSENGER SEAT ATTRIBUTES DURING FLIGHT TAKE-OFF AND LANDING

(71) Applicant: Panasonic Avionics Corporation, Irvine, CA (US)

(72) Inventor: Lam Hoang, Ladera Ranch, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 227 days.

(21) Appl. No.: 18/377,432

(22) Filed: Oct. 6, 2023

(65) Prior Publication Data

US 2025/0115368 A1    Apr. 10, 2025

(51) Int. Cl.
*B64D 45/00*     (2006.01)
*B64D 11/00*     (2006.01)

(52) U.S. Cl.
CPC .......... *B64D 45/00* (2013.01); *B64D 11/0015* (2013.01)

(58) Field of Classification Search
CPC .. B64D 45/00; B64D 11/0015; B64D 11/0624
USPC ......................................................... 701/36
See application file for complete search history.

(56) References Cited

U.S. PATENT DOCUMENTS

| | | | |
|---|---|---|---|
| 7,567,186 B2 * | 7/2009 | Endress | B64D 11/0015 701/3 |
| 10,362,347 B1 * | 7/2019 | Rabii | H04W 4/42 |
| 10,679,153 B2 | 6/2020 | Casado et al. | |
| 2007/0040672 A1 * | 2/2007 | Chinigo | G08B 21/22 340/539.22 |
| 2012/0298737 A1 | 11/2012 | Thakar et al. | |
| 2017/0144773 A1 * | 5/2017 | Raman | B64D 45/00 |
| 2017/0267353 A1 | 9/2017 | McIntosh et al. | |
| 2019/0039734 A1 * | 2/2019 | Shah | G09F 21/00 |

* cited by examiner

*Primary Examiner* — Muhammad Shafi
(74) *Attorney, Agent, or Firm* — LOZA & LOZA, LLP (57) ABSTRACT

Methods and systems are provided for a transportation vehicle. One method includes retrieving data associated with one or more seat attributes associated with one or more passenger seats of an aircraft; identifying a first attribute associated with a passenger seat that does not meet a configurable threshold condition defined for the first attribute for aircraft takeoff, landing or both take-off and landing; determining an action associated with the first attribute that can modify the first attribute to comply with the threshold condition for aircraft takeoff, landing or both take-off and landing; and executing the action associated with the first attribute to meet the threshold condition with the aircraft takeoff, landing or both take-off and landing.

17 Claims, 10 Drawing Sheets

METHODS AND SYSTEMS FOR MANAGING PASSENGER SEAT ATTRIBUTES DURING FLIGHT TAKE-OFF AND LANDING

TECHNICAL FIELD

The present disclosure relates to aircraft in general, and more particularly, to technology for managing passenger seat attributes during flight take-off and/or landing.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Aircrafts today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Before aircraft take-off or landing, typically, cabin crew walk through an aircraft cabin to ensure that passenger seat attributes (e.g., seat position, tray table and other attributes) meet the threshold conditions for take-off and landing. This is undesirable, e.g., if the aircraft is experiencing turbulence or other conditions. Continuous efforts are being made to develop technologies that enable the use of IFE systems to meet take-off and/or landing conditions.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, innovative technology is disclosed for managing passenger attributes, including without limitation, passenger seat position, tray table position, seat belt status, window shade position, power outlet status, universal serial bus (USB) outlet status, a wireless charging module status or any other attribute during a flight take-off, flight landing or both flight take-off and landing (referred to as flight take-off and/or landing). Sensor data associated with one or more seat attributes associated with one or more passenger seats of an aircraft is retrieved. A first attribute associated with a passenger seat that does not meet a configurable threshold condition defined for the first attribute for aircraft takeoff and/or landing is associated. An action associated with the first attribute that can modify the first attribute to comply with the threshold condition for aircraft takeoff and/or landing is determined and executed to meet the threshold condition with the aircraft takeoff and/or landing. The examples illustrating innovative technology are based on aircraft but can be implemented on other vehicle types.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
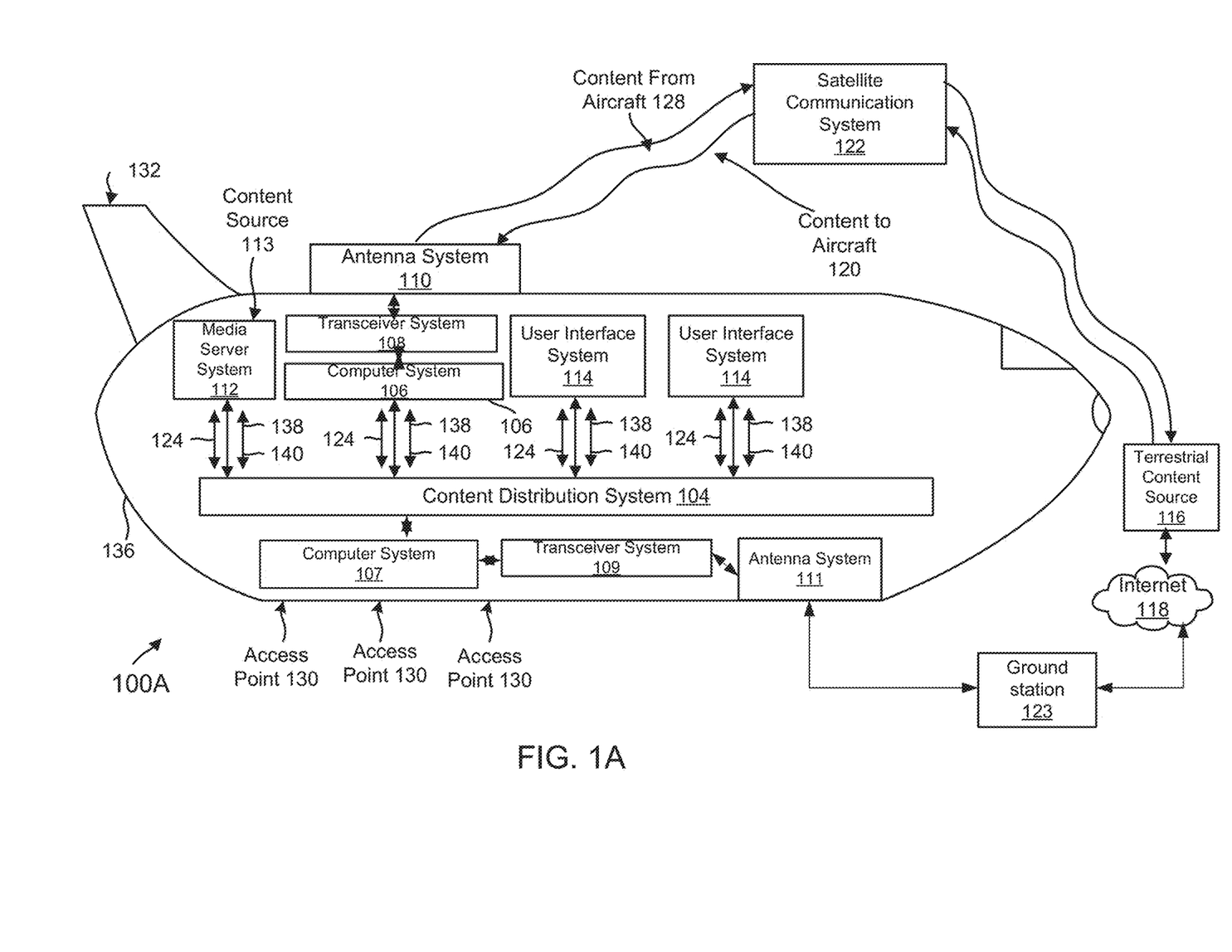
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

System 100A may include one or more content source 113 and one or more user (or passenger) interface systems (may also be referred to as a seat device/seatback device/IFE device 326 described below with respect to FIG. 3) 114 that communicate with a real-time content distribution system 104.

As an example, the content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein is not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, terrestrial content source 116 can be configured to communicate with other terrestrial content sources (not shown). Terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via a wireless access point 130. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
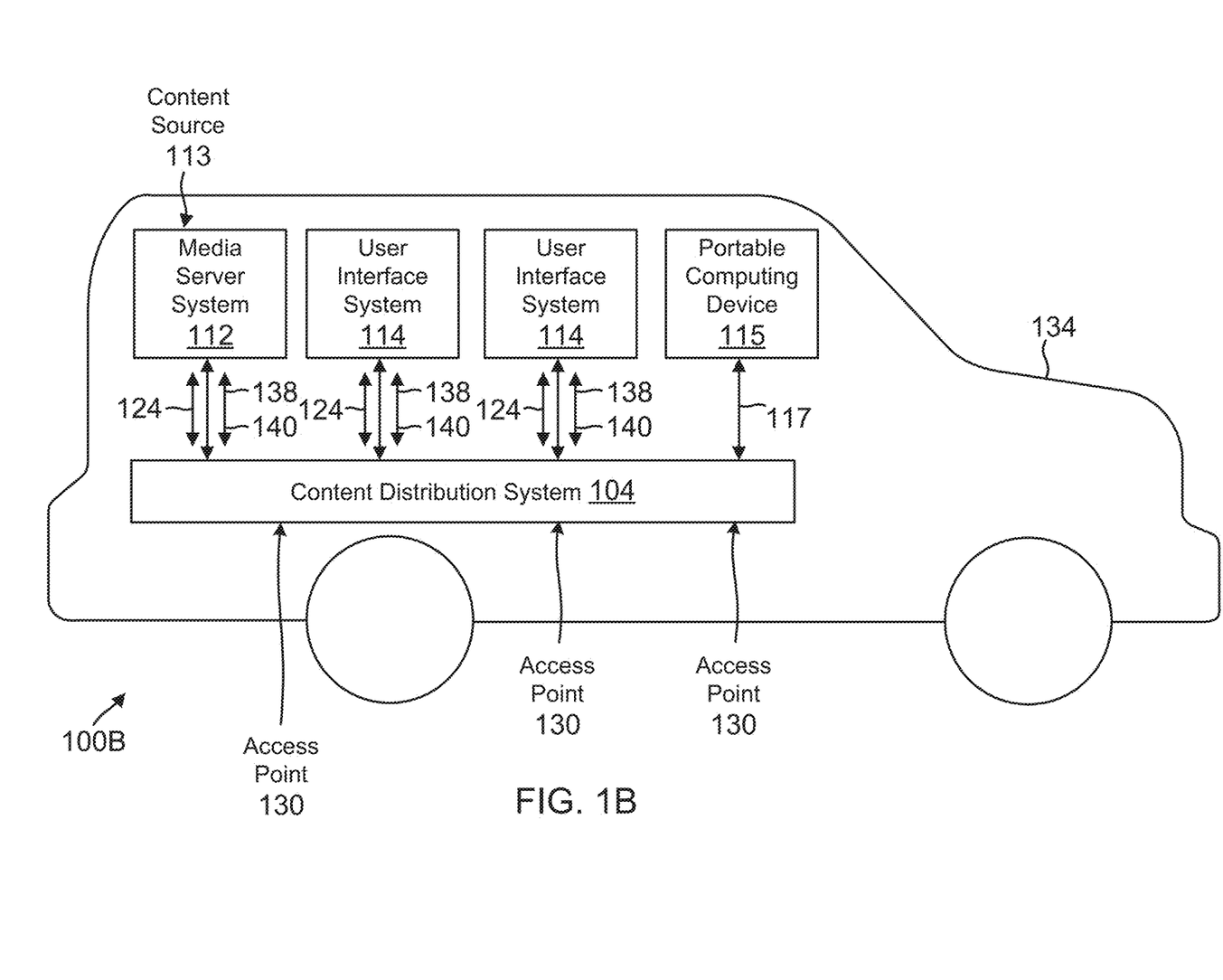
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
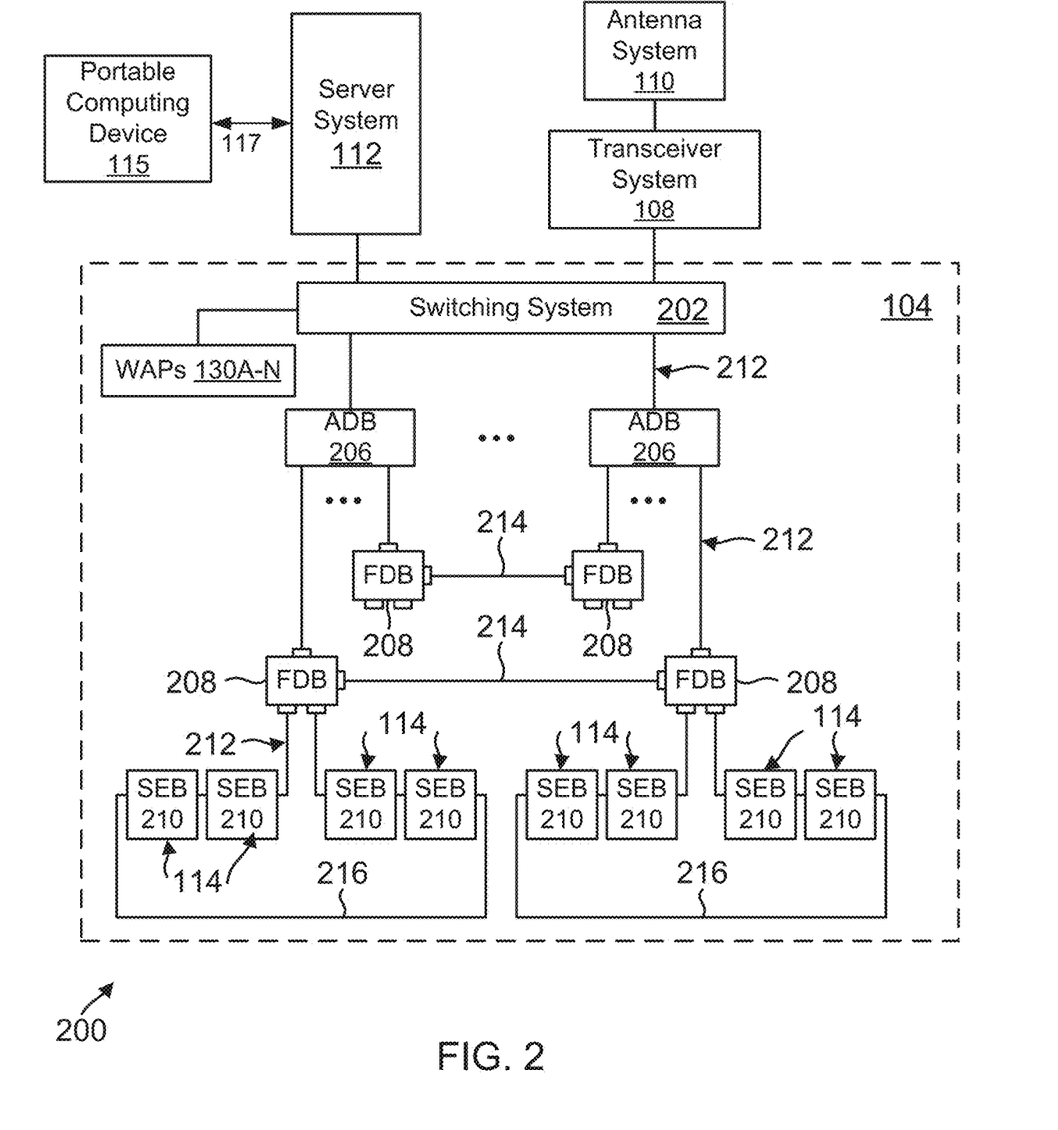
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

Distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
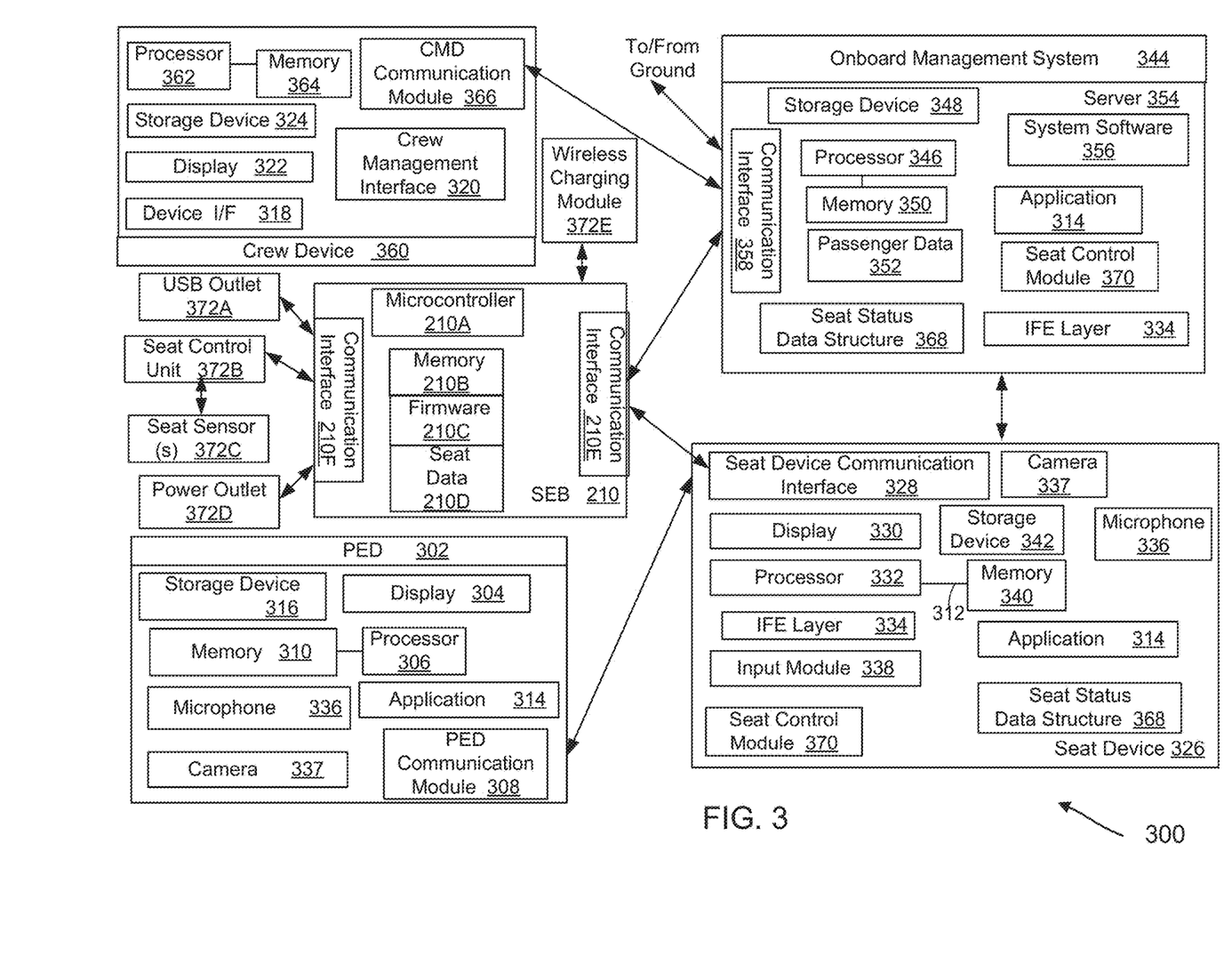
FIG. 3 shows an example of a system for managing seat attributes during take-off and/or landing, according to one aspect of the present disclosure.

System 300:

FIG. 3 shows an example of a system 300 configured to operate within an aircraft system (e.g., an onboard management system 344 executing an IFE layer, may also be referred to as the IFE system), according to one aspect of the present disclosure. In one aspect, system 300 includes one or more SEBs 210 described above with respect to FIG. 2, the onboard management system 344 with a server 354, a seat device 326, a PED 302, when authorized, and a crew device (may be referred to as "CMD") 360, when authorized. In yet another aspect, system 300 includes the CMD 360 and the PED 302 or the CMD 360 and the seat device 326, respectively.

As an example, SEB 210 interfaces with and supplies power (e.g., 28V direct current (DC)) to a USB outlet 372A that can be used to connect a USB cable. The USB outlet 372A can be a USB type A, type C or any other type of outlet. SEB 210 further interfaces with and supplies power to a power outlet 372D. The power outlet 372D may be an alternating current (AC) outlet that receives 115V AC and a USB type C outlet that receives 28 VDC from SEB 210. As an example, SEB 210 may also interface with and supplies power (e.g., 28 VDC) to a wireless charging module 372E.

In one aspect, SEB 210 interfaces with a seat electronic control unit 372B that collects status from one or more seat sensors 372C. The seat sensors 372C are located at different locations of each passenger seat. In one aspect, sensors 372C indicate if a passenger seat is in the upright position, position of a tray table, seat belt status, window status or any other information associated with a passenger seat. This sensor information is provided to SEB 210. In one aspect, SEB 210 and seat control unit 372B communicate via the RS-485 standard protocol that defines the electrical interface and physical layer for point-to-point communication. The RS-485 standard allows for long cabling distances in electrically noisy environments and can support multiple devices on the same bus.

In one aspect, SEB 210 includes a micro-controller 210A that has access to a memory 210B that stores the firmware 210C to control the overall operation of SEB 210. Memory 210B also stores seat data 210D that is collected from seat sensors 372C via a communication interface 210F as well as the status of USB outlet 372A, power outlet 372D and the wireless charging module 372E. SEB 210 provides the seat data 210D to server 354 via a communication interface 210E. It is noteworthy that although communication interface 210E and 210F are shown as separate blocks for convenience, the actual circuity and logic for the communication interface 210E and 210F may be included in a single block. The seat data 210D is used by server 354 to determine if any specific seat attribute meets pre-configured threshold condition for take-off and/or landing of an aircraft, as described below.

In one aspect, the onboard management system 344 includes server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, a seat status data structure 368 (may also be referred to as data structure 368) and a seat control module 370 (may be referred to as module 370) for managing take-off and landing seat conditions, as described below in detail, applications and program files, including system software 356, application 314, and others. It is noteworthy that module 370 may also be executed at the seat device 326, or any other computing device.

In one aspect, system software 356 is executed by processor 346 to control the overall operation of the server 354. Application 314 may be downloaded from server 354 by passengers using an authorized PED 302 paired with the seat device 326 and/or server 354 for accessing digital content.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via the communication interface 358. The communication interface 358 may also be used to receive information from the ground, for example, data 352 and seat data 210D from SEB 210 and other information. The communication interface 358 includes one or more interfaces for a wired and/or wireless connection, as described above with respect to FIGS. 1A/1B and 2.

In one aspect seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options for users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In one aspect, processor 332 executes module 370 and maintains data structure 368 that can be used for managing take-off and landing conditions, as described below.

In another aspect, the seat device 326 may also execute the application 314 that may be used by the passenger to view media content or various computing functions that are enabled by the seat device 326. Application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving voice input. CMD 360 may also include a camera (not shown) for taking pictures or making a video. The CMD 360 may also include a storage device 324 that may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update data structure 352. The non-limiting API format and syntax will depend on the protocols used by the CMD 360 and the onboard management system 344.

In one aspect, the CMD communication module 366 is also used to communicate with the seat device 326, when installed, and one or more PEDs 302. CMI 320 receives information regarding one or more seat attributes that do not meet take-off and/or landing conditions. CMI 320 notifies the seat device and/or paired PED 302 if a passenger needs to take action (e.g., move the passenger seat, tray table, window or any other action).

In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, the PED 302 is securely paired with the seat device 326. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving voice input from a passenger. The voice input can be converted into text by application 314 for processing. In another aspect, PED 302 also includes a camera 337 that may be used by a passenger to upload a video.

PED 302 includes a storage device 316 that may be or may include any storage medium for storing data in a non-volatile manner, such as one or more magnetic or optical based disks, flash memory, or solid-state drive. The storage device 316 may be used to store content displayed on display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third party trademark rights). In addition, application 314 may be provided for download by an airline carrier on a website or from the onboard management system 344.

Figure 4A:
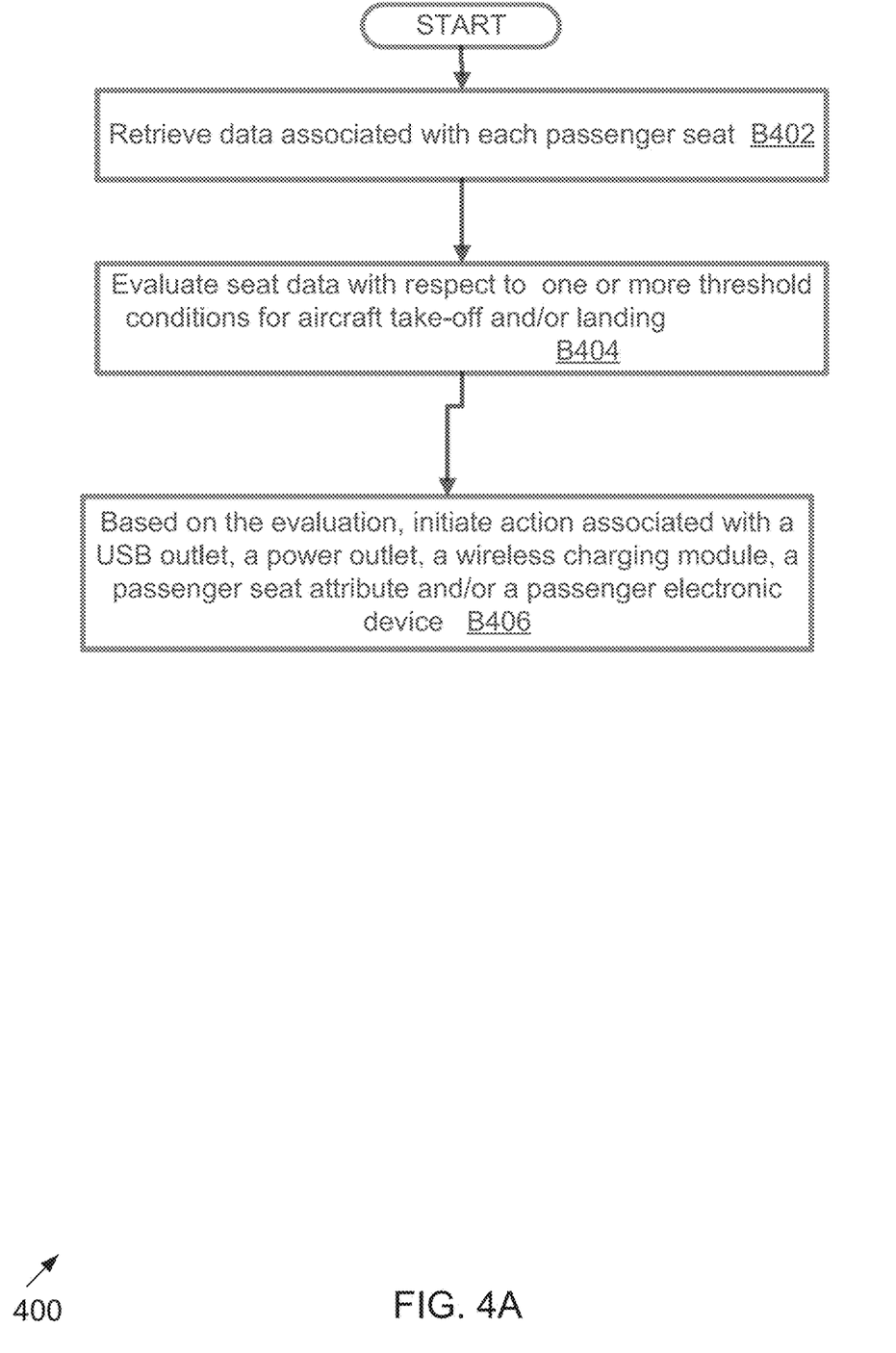
FIG. 4A shows a process flow diagram for managing passenger seat attributes during flight take-off and/or landing, according to one aspect of the present disclosure.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards. In one aspect, the
Process Flow:

FIG. 4A shows a process 400, according to one aspect of the present disclosure. Process 400 begins before a flight take-off as well as before landing. In one aspect, in block B402, SEB 210 collects seat related attributes (seat data 210D) from the USB outlet 372A, power outlet 372D, and wireless charging module 372F. SEB 210 also collects information from the seat control unit 372B that obtains data from seat sensors 372C. The seat sensor data indicates the position of a seat, tray table, windows, seat belts or any other seat related information. Data from USB outlet 372A, power outlet 372D and the wireless charging module 372E indicates if they are operational. SEB 210 provides the seat data 210D to server 354. It is noteworthy that SEB 210 may provide the seat data 210D to another computing device (e.g., a seat device 326, crew device 360 or any other device) that executes the seat control module 370, when an aircraft does not have a dedicated onboard management system 344 or if another device is configured to execute the process blocks of FIG. 4A.

In block B404, the seat data 210D is evaluated by the seat control module 370 based on one or more threshold conditions for take-off and/or landing. The threshold conditions may be stored as part of data structure 368. As an example, the threshold conditions define whether a USB outlet 372A, power outlet 372D or wireless charging module 372E are operational or have been disabled during take-off or landing. The threshold conditions may also define the passenger seat position, the tray table position, status of window, seat belt status or any other condition that may be required for take-off or landing.

Based on the evaluation, in block B406, if a condition is not met, an immediate action is automatically initiated. The nature of the action is based on the condition that is not met. For example, if a USB outlet, a power outlet, or wireless charging module before take-off is not operational, then it may be replaced. If a USB outlet, power outlet or wireless charging module must be off before take-off or landing, a notification is sent to the SEB 210 to turn off the USB outlet, power outlet and/or the wireless charging module. The SEB 210 then temporarily turns off the power. If a passenger seat position, tray table or the window is not in a proper position, or a seat belt is not engaged as defined by data structure 368, then a notification is sent to the passenger seat device immediately. In one aspect, server 354 notifies the crew device 360 that sends a message to the passenger, without the crew member having to walk to the passenger seat. If a paired PED 302 is not in an airplane mode, then a notification is sent to the PED 302 to change its operating mode.

Figure 4B:
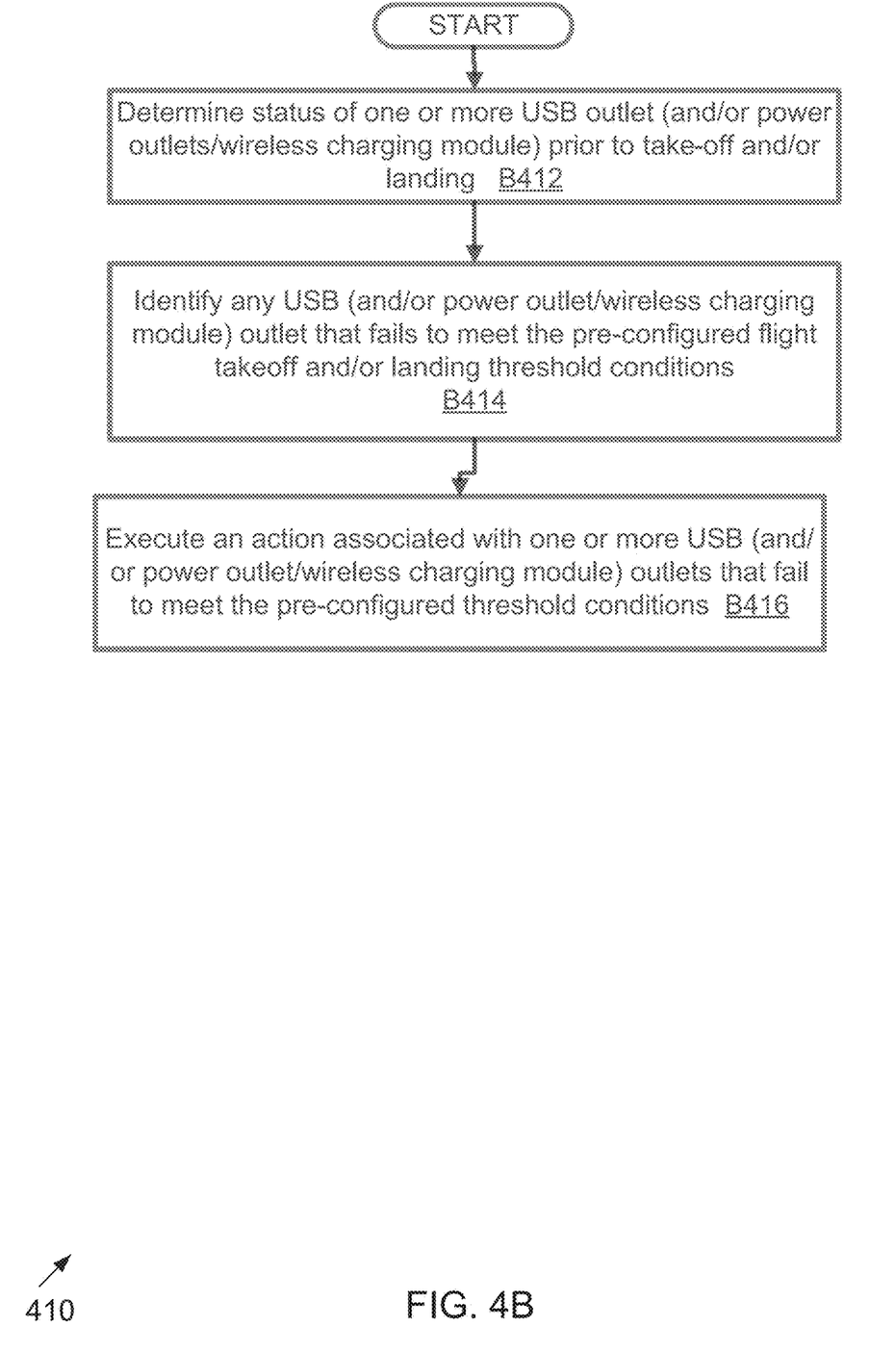
FIG. 4B shows a process flow diagram for managing USB/power outlets during flight take-off and/or landing, according to one aspect of the present disclosure.

FIG. 4B shows a process 410, according to one aspect of the present disclosure. Process 410 begins before a flight take-off as well as before landing. In one aspect, in block B412, SEB 210 collects status of the USB outlet 372B, power outlet 372D, and wireless charging module 372F. Data from USB outlet 372A, power outlet 372D and the wireless charging module 372E indicates if they are operational. SEB 210 provides this information (as part of seat data 210D) to server 354. It is noteworthy that SEB 210 may provide the seat data 210D to another computing device (e.g., a seat device 326, crew device 360 or any other device) that executes the seat control module 370, when an aircraft does not have a dedicated onboard management system 344 or if another device is configured to execute the process blocks of FIG. 4B.

In block B414, the data from the SEB 210 is evaluated by the seat control module 370 to identify any USB outlet, power outlet and/or wireless charging module that does not meet one or more threshold conditions for take-off and/or landing. The threshold conditions may be stored as part of data structure 368. As an example, the threshold conditions define whether a USB outlet 372A, power outlet 372D or wireless charging module 372E have been disabled during take-off and/or landing.

Based on the evaluation, in block B416, if a pre-configured threshold condition is not met, an immediate action is automatically initiated. The nature of the action is based on the condition that is not met. For example, if a USB outlet, a power outlet, or wireless charging module before take-off is not operational, then it may be replaced. If a USB outlet, power outlet or wireless charging module must be off before take-off or landing, a notification is sent to the SEB 210 to turn off the USB outlet, power outlet and/or the wireless charging module. The SEB 210 then temporarily turns off the power.

Figure 4C:
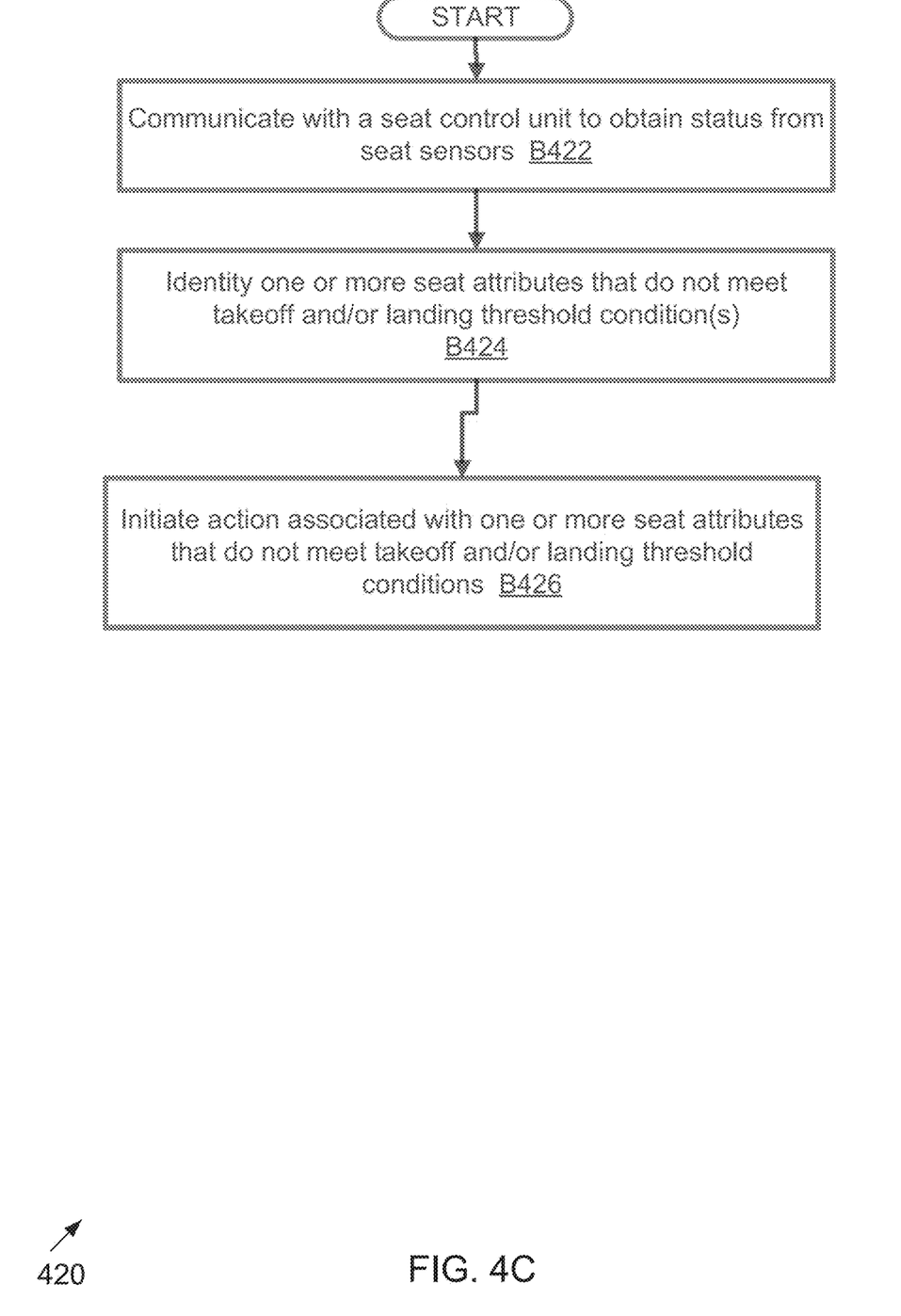
FIG. 4C shows a process flow diagram for managing passenger seat attributes based sensor data from an electric control unit during flight take-off and/or landing, according to one aspect of the present disclosure.

FIG. 4C shows process 420, according to one aspect of the present disclosure. Process 420 begins before a flight take-off as well as before landing. In one aspect, in block B422, SEB 210 collects seat related attributes (seat data 210D) from the seat control unit 372B that obtains data from seat sensors 372C. The seat sensor data indicates the position of a seat, tray table, windows, seat belt status or any other seat related information. SEB 210 provides the seat data 210D to server 354. It is noteworthy that SEB 210 may provide the seat data 210D to another computing device (e.g., a seat device 326, crew device 360 or any other device) that executes the seat control module 370, when an aircraft does not have a dedicated onboard management system 344 or if another device is configured to execute the process blocks of FIG. 4C.

In block B424, the seat data 210D is evaluated by the seat control module 370 based on one or more pre-configured threshold conditions for take-off or landing. The threshold conditions may be stored as part of data structure 368. As an example, the threshold conditions define the passenger seat position, the tray table position, status of window, or seat belt or any other condition that may be required for take-off or landing.

Based on the evaluation, in block B426, if a condition is not met, an immediate action is automatically initiated. The nature of the action is based on the condition that is not met. For example, if a passenger seat position, tray table or the window is not in a proper position, seat belt is not engaged, as defined by data structure 368, then a notification is sent to the passenger seat device immediately. In one aspect, server 354 notifies the crew device 360 that sends a message to the passenger, without the crew member having to walk to the passenger seat.

Figure 4D:
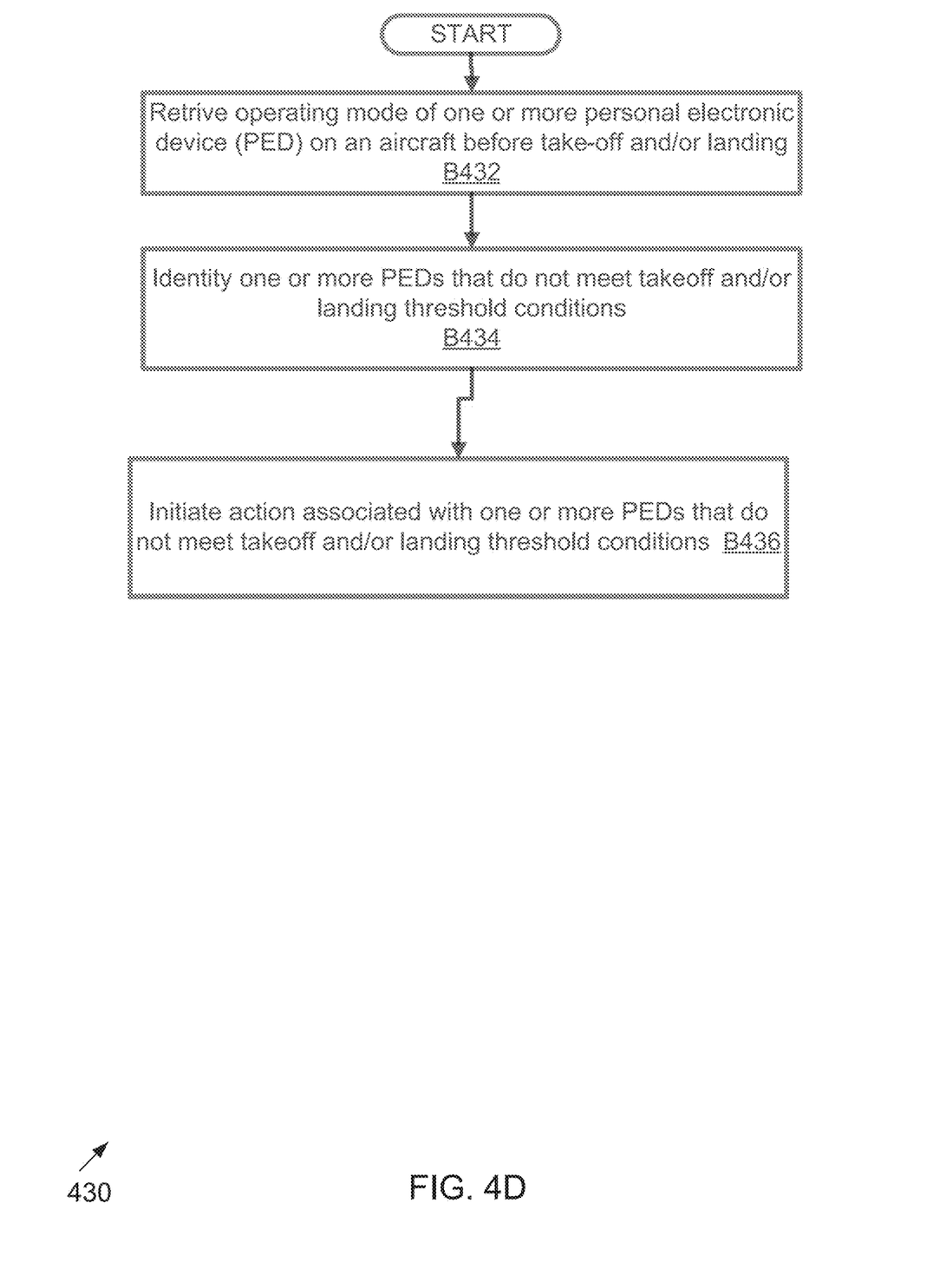
FIG. 4D shows a process flow diagram for managing PED operating modes during flight take-off and/or landing, according to one aspect of the present disclosure.

FIG. 4D shows a process 430, according to one aspect of the present disclosure. Process 430 begins before a flight take-off as well as before landing. In one aspect, in block B432, the operating mode of each PED 302 securely paired to a seat device 326 is obtained. The status may be obtained by the seat device 326. The status is provided to server 354. It is noteworthy that the status can be provided to another computing device (e.g., another seat device 326, crew device 360 or any other device) that executes the seat control module 370, when an aircraft does not have a dedicated onboard management system 344 or if another device is configured to execute the process blocks of FIG. 4D.

In block B434, based on the PED 302 status, one or more PEDs are identified that do not meet the threshold conditions for take-off or landing, e.g., an operating mode of the PED, i.e., the PED must be in an airplane mode. The threshold conditions may be stored as part of data structure 368.

Based on the identification, in block B436, the PED is notified to change its operating mode to an airplane mode. In one aspect, the notification is sent by the crew device 360 and/or the seat device 326.

Figure 4E:
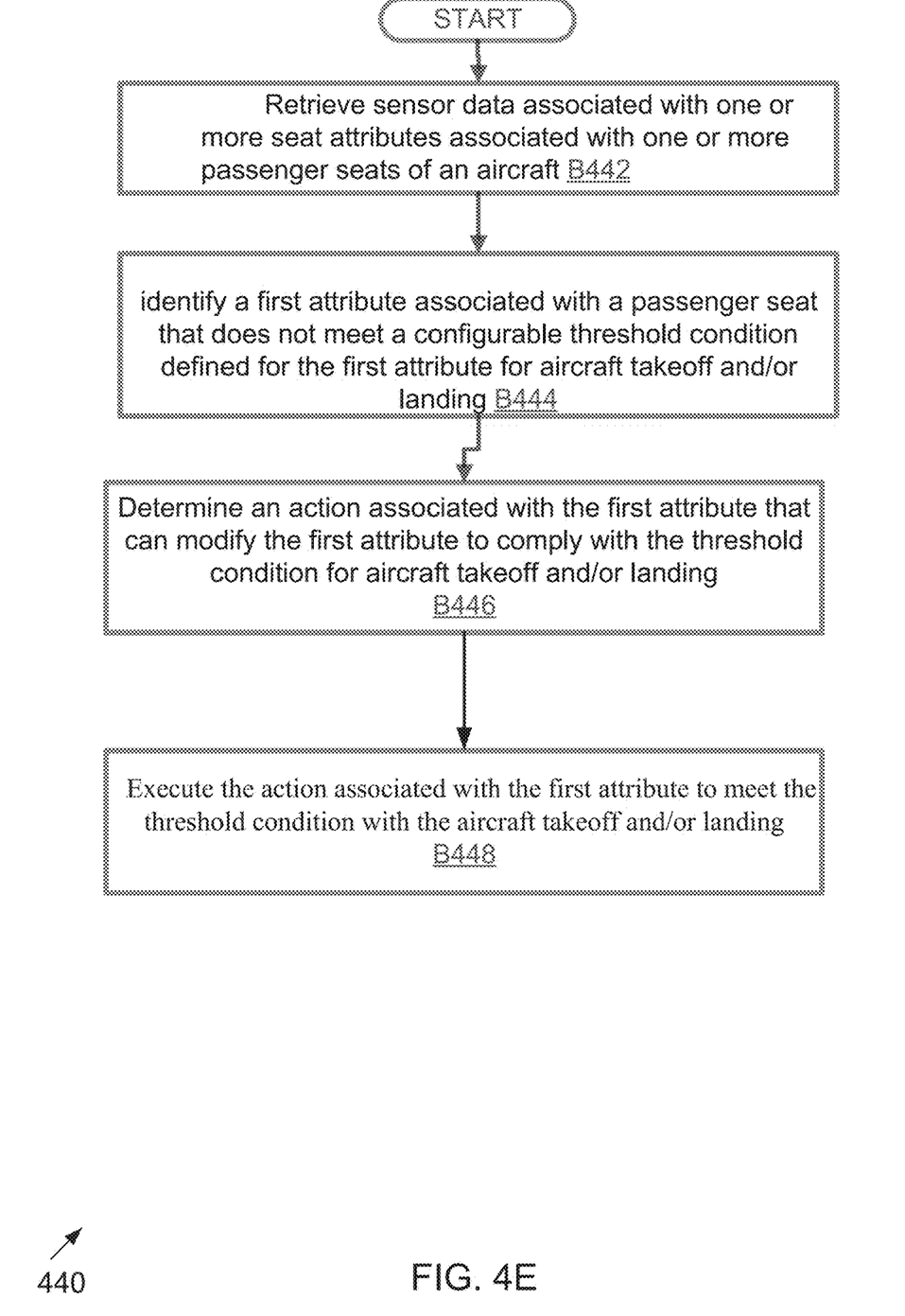
FIG. 4E shows another process flow diagram for managing passenger seat attributes during flight take-off and/or landing, according to one aspect of the present disclosure.

FIG. 4E shows process 440, according to one aspect of the present disclosure. Process 440 begins before a flight take-off as well as before landing. The status is provided to server 354. It is noteworthy that the status can be provided to another computing device (e.g., another seat device 326, crew device 360 or any other device) that executes the seat control module 370, when an aircraft does not have a dedicated onboard management system 344 or if another device is configured to execute the process blocks of FIG. 4D.

In block B442, sensor data associated with one or more seat attributes associated with one or more passenger seats of an aircraft is retrieved. For example, SEB 210 obtains the sensor data (including status of USB outlets, power outlets and wireless charging modules) and provides it to server 354. It is noteworthy that the data can be provided to another computing device (e.g., another seat device 326, crew device 360 or any other device) that executes the seat control module 370, when an aircraft does not have a dedicated onboard management system 344 or if another device is configured to execute the process blocks of FIG. 4E.

In block B444, the seat control module 370 identifies a first attribute associated with a passenger seat that does not meet a configurable threshold condition defined for the first attribute for aircraft takeoff and/or landing. The first attribute may be associated with a USB outlet made, a power outlet, or a wireless charging module. The first attribute may be associated with passenger seat position, a tray table position at the passenger seat, a seat belt, window position or an operating mode of a PED paired with a seat device.

In block B446, the seat control module 370 determines an action associated with the first attribute that can modify the first attribute to comply with the threshold condition for aircraft takeoff and/or landing; and thereafter, in block B448, the action associated with the first attribute to meet the threshold condition with the aircraft takeoff or landing is executed.

The technology disclosed herein improves overall aircraft security and safety. Take-off and landing conditions are met without crew members having to manually inspect each passenger seat.

Figure 5:
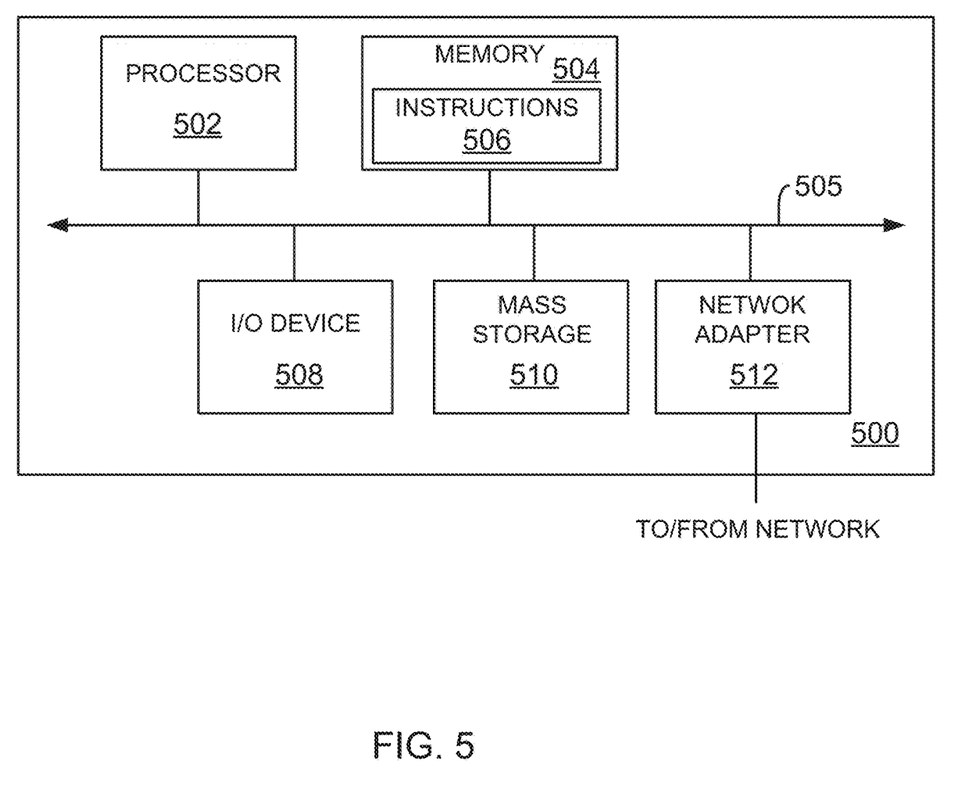
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIG. 4A-4E executed by module 370, CMI 320 as well as the data structure 368, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing passenger seat attributes during take-off and/or landing have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:

retrieving data associated with one or more seat attributes associated with one or more passenger seats of an aircraft;

identifying from the retrieved data a first attribute associated with a passenger seat that does not meet a configurable threshold condition defined for the first attribute for aircraft takeoff, landing or both take-off and landing;

determining an action associated with the first attribute that can modify the first attribute to comply with the threshold condition for aircraft takeoff, landing or both take-off and landing; and executing the action associated with the first attribute to meet the threshold condition with the aircraft takeoff, landing or both take-off and landing, wherein the first attribute is associated with an operating mode of a personal electronic device paired with an in-flight entertainment system.

2. The method of claim 1, wherein the first attribute is associated with a universal serial bus (USB) outlet made available at the passenger seat.

3. The method of claim 1, wherein the first attribute is associated with a power outlet made available at the passenger seat.

4. The method of claim 1, wherein the first attribute is associated with a passenger seat position.

5. The method of claim 1, wherein the first attribute is associated with a tray table position at the passenger seat.

6. The method of claim 1, wherein the first attribute is associated with a seat belt located at the passenger seat.

7. A non-transitory machine-readable storage medium having stored thereon instructions for performing a method, comprising machine executable code which when executed by at least one machine, causes the machine to:

retrieve data associated with one or more seat attributes associated with one or more passenger seats of an aircraft;

identify from the retrieved a first attribute associated with a passenger seat that does not meet a configurable threshold condition defined for the first attribute for aircraft takeoff, landing or both take-off and landing;

determine an action associated with the first attribute that can modify the first attribute to comply with the threshold condition for aircraft takeoff, landing or both take-off and landing; and execute the action associated with the first attribute to meet the threshold condition with the aircraft takeoff, landing or both take-off and landing, wherein the first attribute is associated with an operating mode of a personal electronic device paired with an in-flight entertainment system.

8. The non-transitory machine-readable storage medium of claim 7, wherein the first attribute is associated with a universal serial bus (USB) outlet made available at the passenger seat.

9. The non-transitory machine-readable storage medium of claim 7, wherein the first attribute is associated with a power outlet made available at the passenger seat.

10. The non-transitory machine-readable storage medium of claim 7, wherein the first attribute is associated with a passenger seat position.

11. The non-transitory machine-readable storage medium of claim 7, wherein the first attribute is associated with a tray table position at the passenger seat.

12. The non-transitory machine-readable storage medium of claim 7, wherein the first attribute is associated with a seat belt located at the passenger seat.

13. A system, comprising:

a memory containing machine readable medium comprising machine executable code having stored thereon instructions; and a processor coupled to the memory to execute the machine executable code to:

retrieve data associated with one or more seat attributes associated with one or more passenger seats of an aircraft;

identify a first attribute associated with a passenger seat that does not meet a configurable threshold condition defined for the first attribute for aircraft takeoff, landing or both take-off and landing;

determine an action associated with the first attribute that can modify the first attribute to comply with the threshold condition for aircraft takeoff, landing or both take-off and landing; and execute the action associated with the first attribute to meet the threshold condition with the aircraft takeoff, landing or both take-off and landing, wherein the first attribute is associated with an operating mode of a personal electronic device paired with an in-flight entertainment system.

14. The system of claim 13, wherein the first attribute is associated with a universal serial bus (USB) outlet made available at the passenger seat.

15. The system of claim 13, wherein the first attribute is associated with a power outlet made available at the passenger seat.

16. The system of claim 13, wherein the first attribute is associated with a passenger seat position.

17. The system of claim 13, wherein the first attribute is associated with a tray table position at the passenger seat.

* * * * *